(12) United States Patent
Han

(10) Patent No.: US 8,035,701 B2
(45) Date of Patent: Oct. 11, 2011

(54) IMAGE TUNING SYSTEM AND METHOD USING STORED RAW IMAGE SIGNAL

(75) Inventor: Yong-In Han, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 621 days.

(21) Appl. No.: 11/680,094

(22) Filed: Feb. 28, 2007

(65) Prior Publication Data

US 2007/0200932 A1 Aug. 30, 2007

(30) Foreign Application Priority Data

Feb. 28, 2006 (KR) .................... 10-2006-0019340

(51) Int. Cl.
*H04N 5/76* (2006.01)

(52) U.S. Cl. ........... 348/231.99; 348/222.1; 348/207.99; 348/207.1; 348/231.5; 382/167

(58) Field of Classification Search ............. 348/231.99
See application file for complete search history.

(56) References Cited

U.S. PATENT DOCUMENTS

| | | | |
|---|---|---|---|
| 6,061,089 A * | 5/2000 | Tonkin et al. ............... | 348/211.6 |
| 6,188,440 B1 * | 2/2001 | Toujima et al. .............. | 348/554 |
| 7,269,543 B2 * | 9/2007 | Salmonsen et al. .......... | 703/23 |
| 2003/0163484 A1 | 8/2003 | Salmonsen et al. | |
| 2005/0015523 A1 * | 1/2005 | Ishida et al. ............... | 710/52 |
| 2005/0141762 A1 * | 6/2005 | Zhao et al. ................. | 382/164 |
| 2006/0055785 A1 * | 3/2006 | Nagajima ............... | 348/207.99 |

FOREIGN PATENT DOCUMENTS

| | | | |
|---|---|---|---|
| JP | 2000-013669 | | 1/2000 |
| JP | 2005-328453 | | 11/2005 |
| JP | 2005328453 A | * | 11/2005 |
| JP | 2003-348519 | | 2/2007 |
| WO | 02/21823 A1 | | 3/2002 |

OTHER PUBLICATIONS

First Office Action issued by the Taiwan Patent Office on Jan. 19, 2011.

* cited by examiner

Primary Examiner — Jason Chan
Assistant Examiner — Cynthia Calderon
(74) Attorney, Agent, or Firm — F. Chau & Associates, LLC

(57) ABSTRACT

An image tuning system and method using a stored image signal, in which the image tuning system includes an image processing device and an external device. The image processing device outputs a third image signal by processing a first or second image signal according to a tuning parameter. The external device calculates the tuning parameter based on the third image signal. The image processing device receives the second image from the external device in a tuning mode and processes the second image. The image tuning system and the image tuning method using the stored raw image signal can prevent wasting time and extra efforts are not required for setting the tuning parameter adaptive to various weather conditions by repeatedly setting the tuning parameter with respect to a picture image.

20 Claims, 5 Drawing Sheets

IMAGE TUNING SYSTEM AND METHOD USING STORED RAW IMAGE SIGNAL

CROSS-REFERENCE TO RELATED PATENT APPLICATION

This application claims the benefit of Korean Patent Application No. 10-2006-0019340, filed on Feb. 28, 2006, in the Korean Intellectual Property Office, the disclosure of which is incorporated herein in its entirety by reference.

BACKGROUND OF THE INVENTION

1. Technical Field

The present disclosure relates to an image tuning system and, more particularly, to an image tuning system and method using a stored raw image signal.

2. Discussion of the Related Art

Generally, a camera is tuned for an image to be captured using a predetermined parameter. This parameter for tuning has to satisfy various weather conditions. To set the tuning parameter to be adaptive to various weather conditions, various pictures are taken and captured before launching a new product for image capture. The tuning parameter is adjusted repeatedly based on a captured image signal.

Thus, a large amount of images are needed for adjusting the tuning parameter. The images, however, are for temporary use and are subsequently discarded. Accordingly, it is time consuming and extra efforts are required for setting the tuning parameter to be adapted to various weather conditions.

SUMMARY OF THE INVENTION

Exemplary embodiments of the present invention provide an image tuning system using a stored raw image signal capable of preventing wasting time and not requiring extra efforts for setting a tuning parameter adaptive to various weather conditions.

Exemplary embodiments of the present invention provide an image tuning method using a stored raw image signal capable of preventing wasting time and not requiring extra efforts for setting a tuning parameter adaptive to various weather conditions.

According to an exemplary embodiment of the present invention, there is provided an image tuning system using a stored raw image signal, the image tuning system including an image processing device and an external device.

In the exemplary embodiment of the present invention, the image processing device outputs a third image signal by processing a first or second image signal according to a tuning parameter. The external device calculates the tuning parameter based on the third image signal.

The image processing device receives the second image signal from the external device in a tuning mode and processes the second image signal. The image tuning system further includes an interface device interfacing between the image processing device and the external device to communicate the image signals thereof.

The image processing device includes an image sensor and a processor.

The image sensor receives the first image signal from outside the image processing device. The processor receives and processes the first or second image signal. The image sensor and the processor are embodied in one chip. The image processing device receives the second image signal and transmits the third image signal in the tuning mode concurrently.

The image processing device further includes a multiplexer selecting one of the first and second image signals and processing the selected image signal. The image processing device further includes a serial transmission unit serially transmitting the third image signal to the interface device in the tuning mode. The image processing device further includes a parallel receiving unit receiving the second image signal in parallel in the tuning mode.

The interface device includes first and second buffers and an interface processing unit.

The first buffer buffers the first image signal received from the image processing device so as to transmit the first image signal to the external device. The second buffer buffers the second image signal received from the external device so as to transmit the second image signal to the image processing device. The interface processing unit participates in communications of the image signals.

The interface processing unit may be a field programmable gate array (FPGA). The first and second buffers are SDRAMs. The interface device receives and transmits the second image signal and receives and transmits the third image signal in the tuning mode concurrently.

The external device includes a driver and a tuning tool.

The storage unit stores the second image signal. The driver transmits and receives the image signals. The tuning tool sets the tuning parameter based on the third image signal. The external device transmits the second image signal and receives the third image signal in the tuning mode concurrently.

The image tuning system further includes a USB port transmitting and receiving the image signals between the interface device and the external device. In which case, the driver is a USB driver.

The first image signal is an image signal received from outside, and the second image signal is an image signal obtained by storing the first image signal in the external device. The first and second image signals are raw image signals.

The image tuning system is an off-line image tuning system. The image tuning system calculates the tuning parameter based on the third image signal obtained by processing the first image signal in a normal mode. The image tuning system generates the second image signal by storing the first image signal, which is not processed in the external device in a capture mode.

According to an exemplary embodiment of the present invention, there is provided an image tuning method using a stored raw image signal, the method including: outputting a third image signal by processing a first or second image signal according to a tuning parameter; and calculating the tuning parameter based on the third image signal.

In the exemplary embodiment of the present invention, in outputting the first or second image signal as the third image signal, the second image is processed in a tuning mode. The first image signal is an image signal that is received from outside and transmitted to the image tuning system, and the second image signal is an image signal obtained by storing the first image signal in a first device of the image tuning system. The first and second image signals are raw image signals.

The operation of outputting the first or second image signal as the third image signal includes selecting one of the first and second image signals and processing the selected image signal. In outputting the first or second image signal as the third image signal, receiving the second image signal and outputting the third image signal are performed concurrently in the tuning mode.

The operation of outputting the first or second image signal as the third image signal may further include serially outputting the third image signal in the tuning mode. The operation of outputting the first or second image signal as the third image signal may further include receiving the second image signal in parallel in the tuning mode.

The operation of calculating the tuning parameter includes receiving the third image signal and setting the tuning parameter based on the third image signal. The operation of receiving the third image signal is carried through a USB interface.

The image tuning method is performed by an off-line image tuning system and includes calculating the tuning parameter based on the third image signal obtained by processing the first image signal in a normal mode. The image tuning method generates the second image signal by storing the first image signal that is not processed in a first device of the image tuning system.

BRIEF DESCRIPTION OF THE DRAWINGS

Exemplary embodiments of the present invention will be understood in more detail from the following descriptions taken in conjunction with the attached drawings in which.

DETAILED DESCRIPTION OF EXEMPLARY EMBODIMENTS

Figure 1:
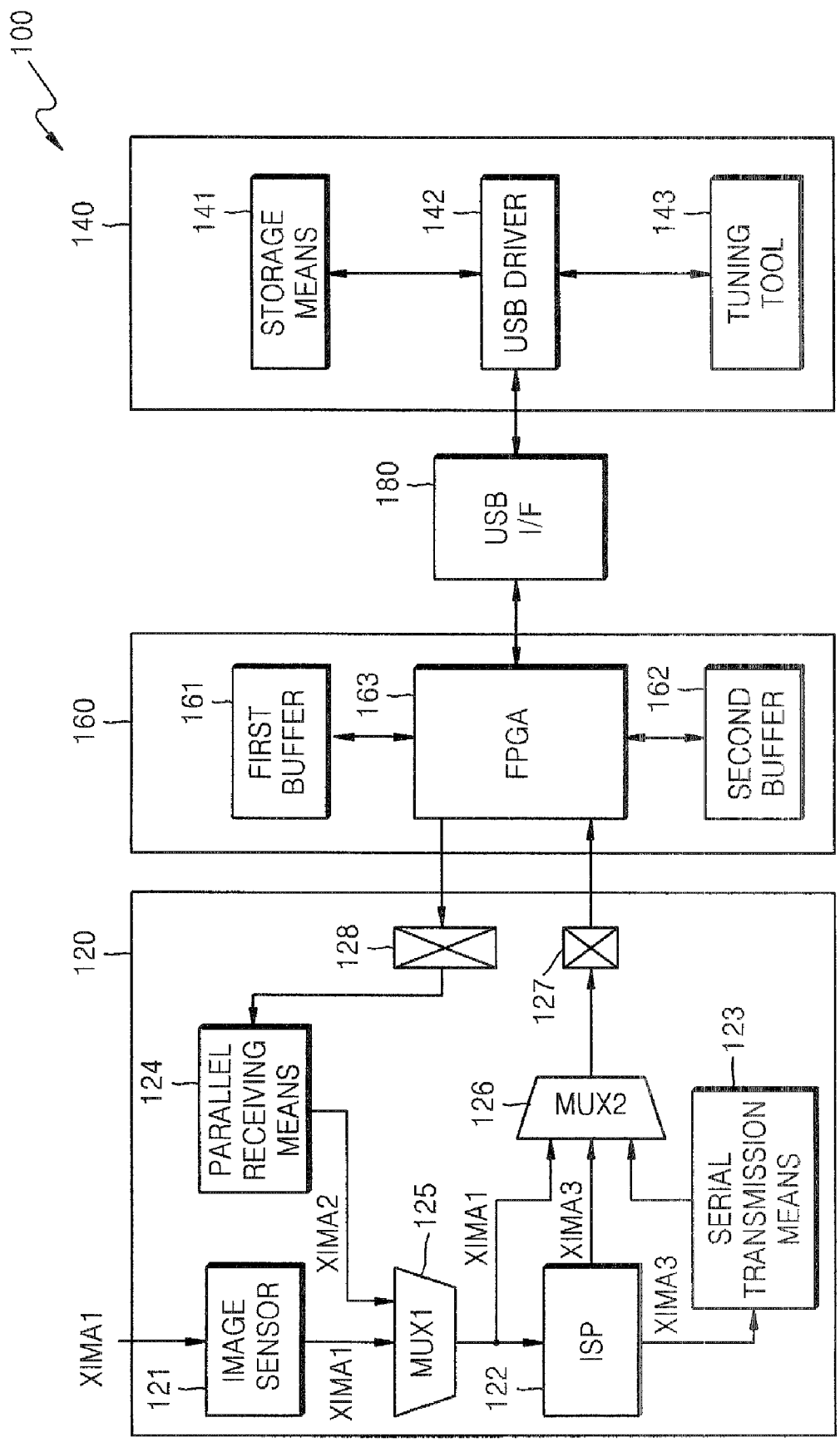
FIG. 1 is a block diagram showing an image tuning system according to an exemplary embodiment of the present invention.

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings. Like reference numerals in the drawings denote like elements.

FIG. 1 is a block diagram showing an image tuning system according to an exemplary embodiment of the present invention.

Referring to FIG. 1, the image tuning system 100 using a raw image signal includes an image processing device 120 and an external device 140.

The image processing device 120 processes a first image signal XIMA1 or a second image signal XIMA2 according to a tuning parameter. The image signals processed by the image processing device 120 are output as a third image signal XIMA3. The external device 140 calculates the tuning parameter based on the third image signal XIMA3.

Then, the first image signal XIMA1 is an image signal received from outside. That is, the first image signal XIMA1 is an image signal initially captured by a camera. The second image signal XIMA2 is an image signal that has been stored in the external device 140. The first image signal XIMA1 and the second image signal XIMA2 are raw image signals that have not been tuned.

The image tuning system 100 further includes an interface device 160. The interface device 160 interfaces between the image processing device 120 and the external device 140 to communicate the image signals thereof. The image processing device 120 and the interfacing device 160 are mounted on the camera itself.

The image processing device 120 includes an image sensor 121 and an image signal processor 122. The image sensor 121 received the first image signal XIMA1 from outside. The image signal processor 122 receives and processes the first or second image signal XIMA1 or XIMA2. The image processing device 120 embodies the image sensor 121 and the processor 122 in one chip.

Referring to FIG. 1, the interfacing device 160 includes first and second buffers 161 and 162 and an interface processing unit 163. The interface device 160 is generally referred to as a capture board.

The first buffer 161 buffers the first image signal XIMA1 received from the image processing device 120 so as to transmit the first image signal XIMA1 to the external device 140. The second buffer 162 buffers the second image signal XIMA2 received from the external device 140 so as to transmit the second image signal XIMA2 to the image processing device 120. The interface processing unit 163 participates in communications of the first, second, and third image signals XIMA1, XIMA2, and XIMA3.

The interface processing unit 163 may be a field programmable gate array (FPGA). The first and second buffers 161 and 162 may be SDRAMs.

The external device 140 includes a storage unit 141, a driver 142, and a tuning tool 143. The external device 140 may be a general personal computer (PC).

The storage unit 141 stores the second image signal XIMA2. The driver transmits and receives the first, second, and third image signals XIMA1, XIMA2, and XIMA3. The tuning tool 143 sets the tuning parameter based on the third image signal XIMA3. The set tuning parameter is transmitted to the image signal processor 122 of the image processing device 120.

The image tuning system 100 further includes a USB port 180 for transmitting and receiving the image signals XIMA1, XIMA2, and XIMA3 between the interface device 160 and the external device 140. The driver 142 of the external device 140 is a USB driver.

Figure 2:
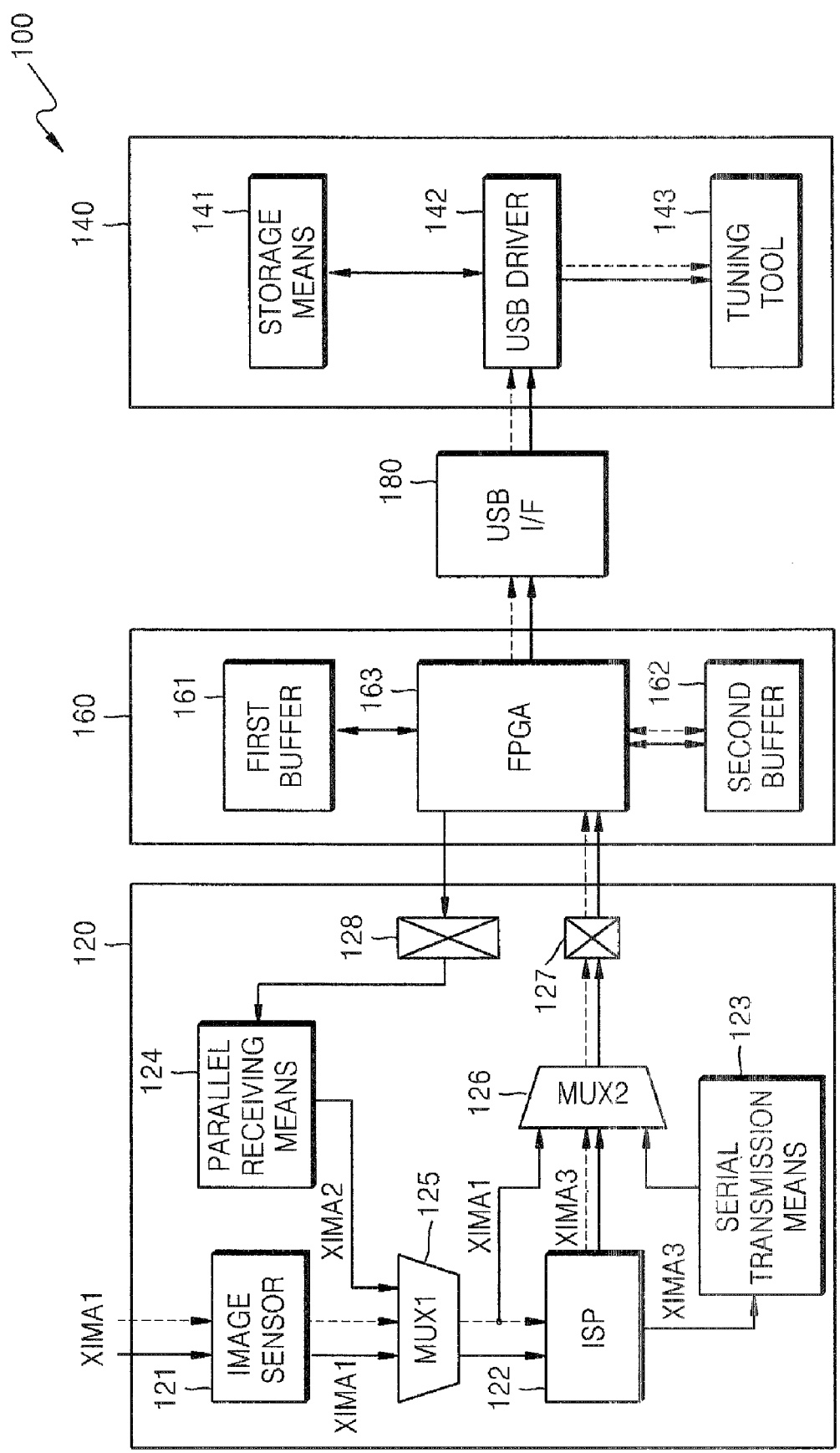
FIG. 2 is a block diagram showing a normal mode operation of the image tuning system of FIG. 1.

FIG. 2 shows a normal mode of operation for the image tuning system 100 of FIG. 1.

Referring to FIG. 2, the image tuning system in the normal mode calculates the tuning parameter based on the third image signal obtained by processing the first image signal. That is, the normal mode is generally a mode setting a tuning parameter by processing the first image signal XIMA1. In FIG. 2, the operation of the image tuning system 100 in the normal mode is denoted by dotted line arrows.

In the normal mode, the image sensor 121 of the image processing device 120 receives the first image signal XIMA1 from outside. The image processing device 120 further includes a multiplexer 125 for selecting one of the first and second image signals XIMA1 and XIMA2 and processing the selected image signal. In the normal mode, the multiplexer 125 selects the first image signal XIMA1 and transmits the first image signal XIMA1 to the processor 122.

The processor 122 outputs the processed first image signal XIMA1 as the third image signal XIMA3. The image processing device 120 further includes a multiplexer 126 for selecting an output of the image processing device 120 according to each mode. In the normal mode, the multiplexer 126 selects and outputs the third image signal XIMA3 directly applied from the processor 122.

The third image signal XIMA3 is transmitted to the external device 140 through the interface processing unit 163 of the interface device 160 and the second buffer 162. The third image signal XIMA3 is transmitted to the driver of the external device 140 via the USB port 180. The driver 142 transmits the third image signal XIMA3 to the tuning tool 143. The tuning tool 143 sets the tuning parameter based on the third image signal XIMA3.

That is, the image tuning system 100 sets the tuning parameter based on the third image signal XIMA3 obtained by processing the first image signal XIMA1 in the normal mode.

Figure 3:
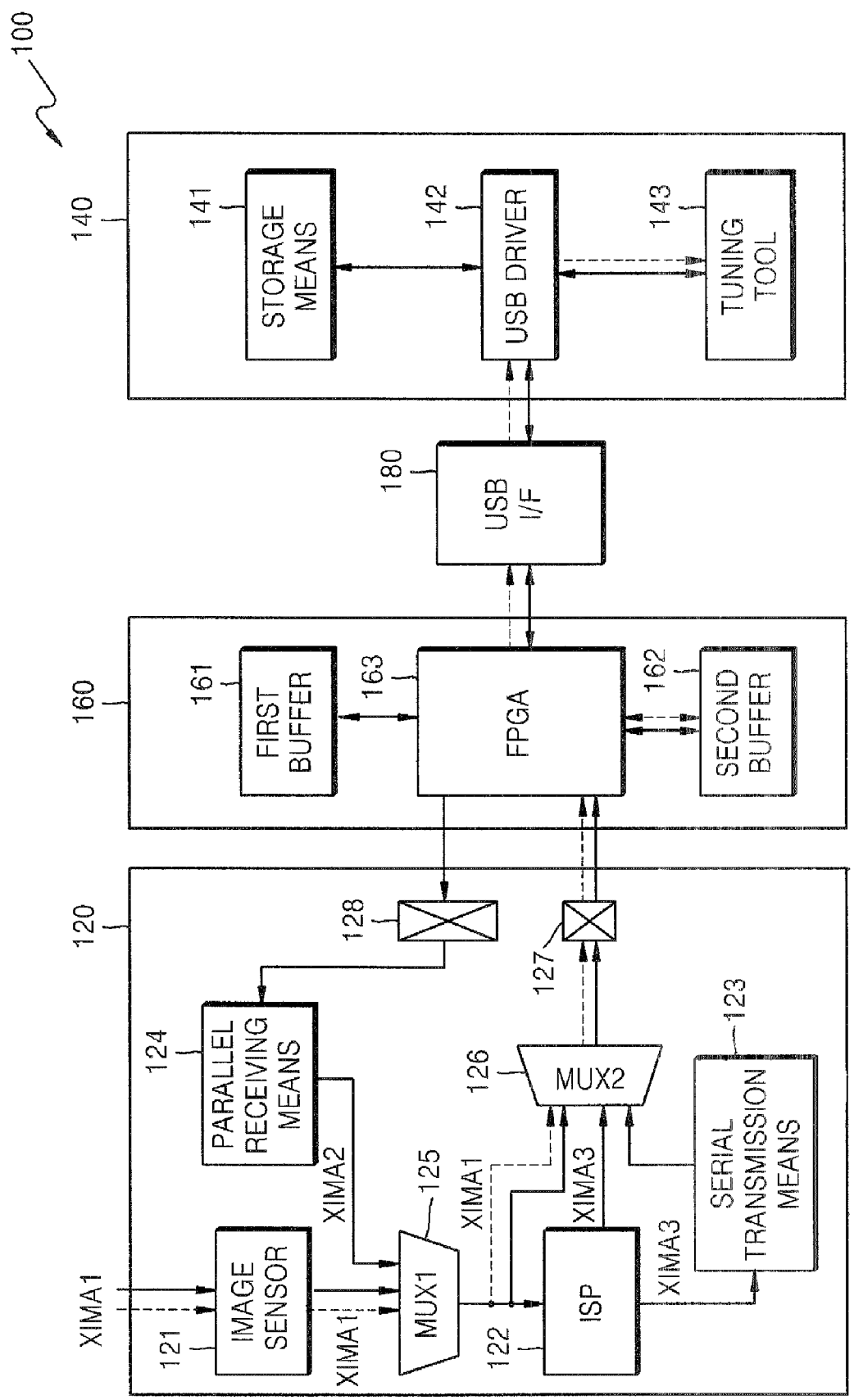
FIG. 3 is block diagram showing a capture mode operation of the image tuning system of FIG. 1.

FIG. 3 shows a capture mode operation of the image tuning system of FIG. 1.

Referring to FIG. 3, the image tuning system 100 does not process the first image signal XIMA1 in the capture mode but stores the first image signal XIMA1 in the external device 140. That is, the image tuning system 100 stores the first image signal XIMA1 in the capture mode and generates the second image signal XIMA2. In FIG. 3, the operation of the image tuning system 100 in the capture mode is denoted by dotted line arrows.

In the capture mode, the image sensor 121 of the image processing device 120 receives the first image signal XIMA1 from outside. The multiplexer 125 selects the first image signal XIMA1. Then, although the first image signal XIMA1 is passed through the processor 122, the first image signal is not processed and is output. In FIG. 3, unlike the normal mode, in the capture mode, the first image signal XIMA1 is shown not being passed through the processor, so as to intuitively indicate that the first image signal XIMA1 is not processed.

An operation of the interfacing device 160 in the capture mode is the same as that in the normal mode. In the capture mode, the external device 140 receives the first image signal XIMA1 and stores the first image signal XIMA1 in the storage unit 141.

Figure 4:
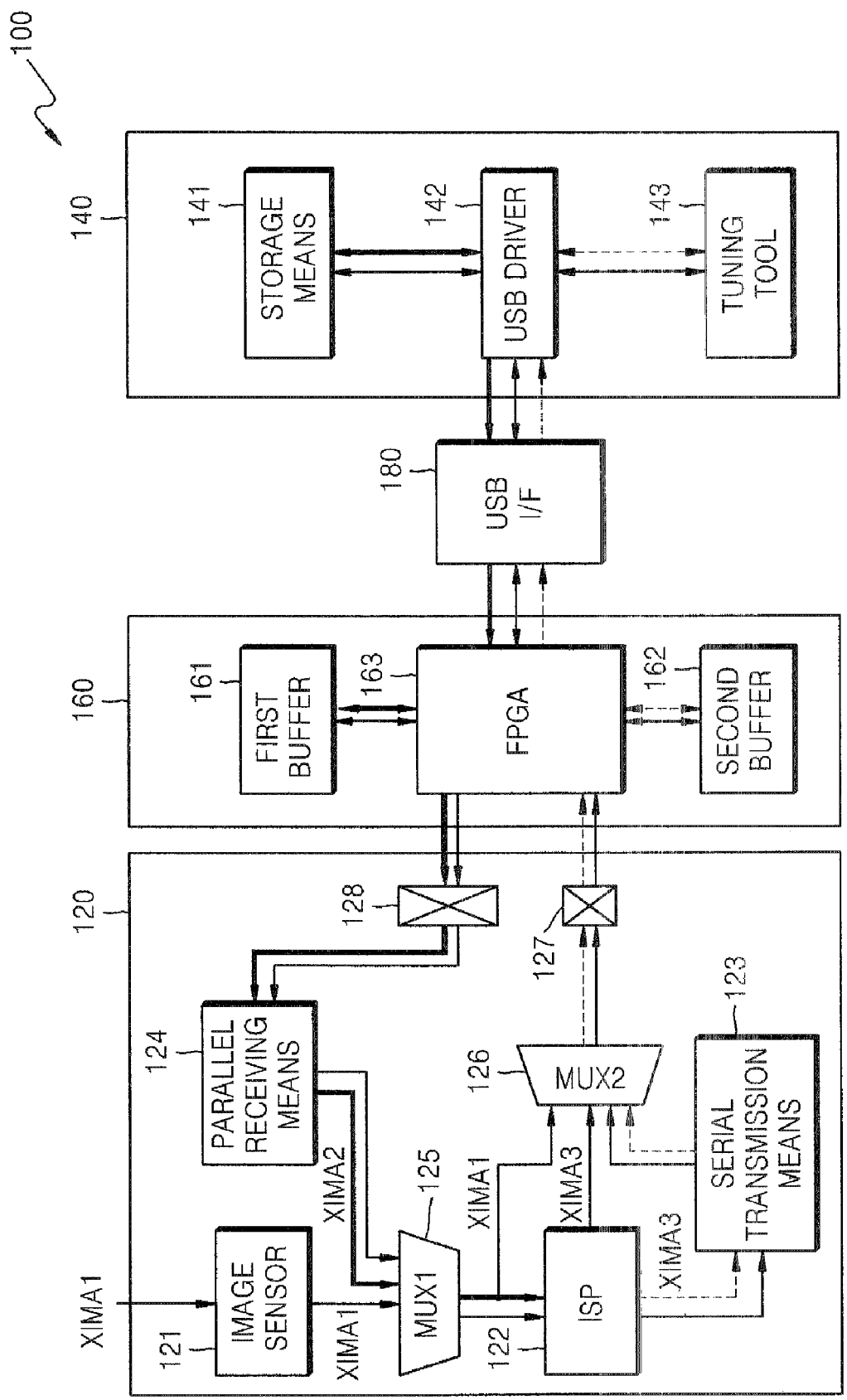
FIG. 4 is a block diagram showing a tuning mode operation of the image tuning system of FIG. 1.

FIG. 4 shows a tuning mode operation of the image tuning system of FIG. 1.

Referring to FIG. 4, the image tuning system processes the second image signal XIMA2 in a tuning mode. The second image signal XIMA2 is transmitted from the storage unit 141 of the external device 140. In FIG. 4, the operation of the image tuning system in the tuning mode is denoted by dotted line arrows and bold arrows.

The second image signal XIMA2 output from the storage unit in the tuning mode is transmitted to the interface device 160 via the driver 142 and the USB port 180. Then the interfacing device 160 uses the first buffer 161 for transmitting and receiving the second image signals XIMA2.

The image processing device 120 further includes a parallel receiving unit 124 for receiving the second image signal XIMA2 in parallel in the tuning mode. The image processing device 120 further includes a plurality of input pins 128 for receiving the second image signal XIMA2 in parallel.

The parallel receiving unit 124 transmits the second image signal XIMA2 to the multiplexer 125. The multiplexer 125 selects the second image signal XIMA2 and transmits the second image signal XIMA2 to the processor 122. The processor 122 processes the second image signal XIMA2 and generates the third image signal XIMA3 therefrom.

Unlike the normal mode, in the tuning mode, the processor transmits the third image signal XIMA3 to a serial transmission unit 123. The serial transmission unit 123 serially outputs the third image signal XIMA3. The third image signal XIMA3 serially output from serial transmission unit 123 is transmitted to the interface device 160 via the multiplexer 126 and an output pin 127. Thereafter, a procedure in which the third image signal XIMA3 is transmitted to the tuning tool 143 of the external device 140 is the same as in the normal mode.

The image processing device 120 receives the second image signal XIMA2 and transmits the third image signal XIMA3 concurrently in the tuning mode by including the serial transmission unit 123 and the parallel receiving unit 124. In addition, the image processing device 120 serially transmits the third image signal and receives the second image signal in parallel to maximize the efficiency of the system with respect to the available resources.

Similarly, the interface device 160 performs transmitting and receiving of the second image signal XIMA2 and transmitting and receiving of the third image signal XIMA3 concurrently in the tuning mode. In addition, in the tuning mode, the external device 140 transmits the second image signal XIMA2 and receives the third image signal XIMA3 concurrently.

Figure 5:
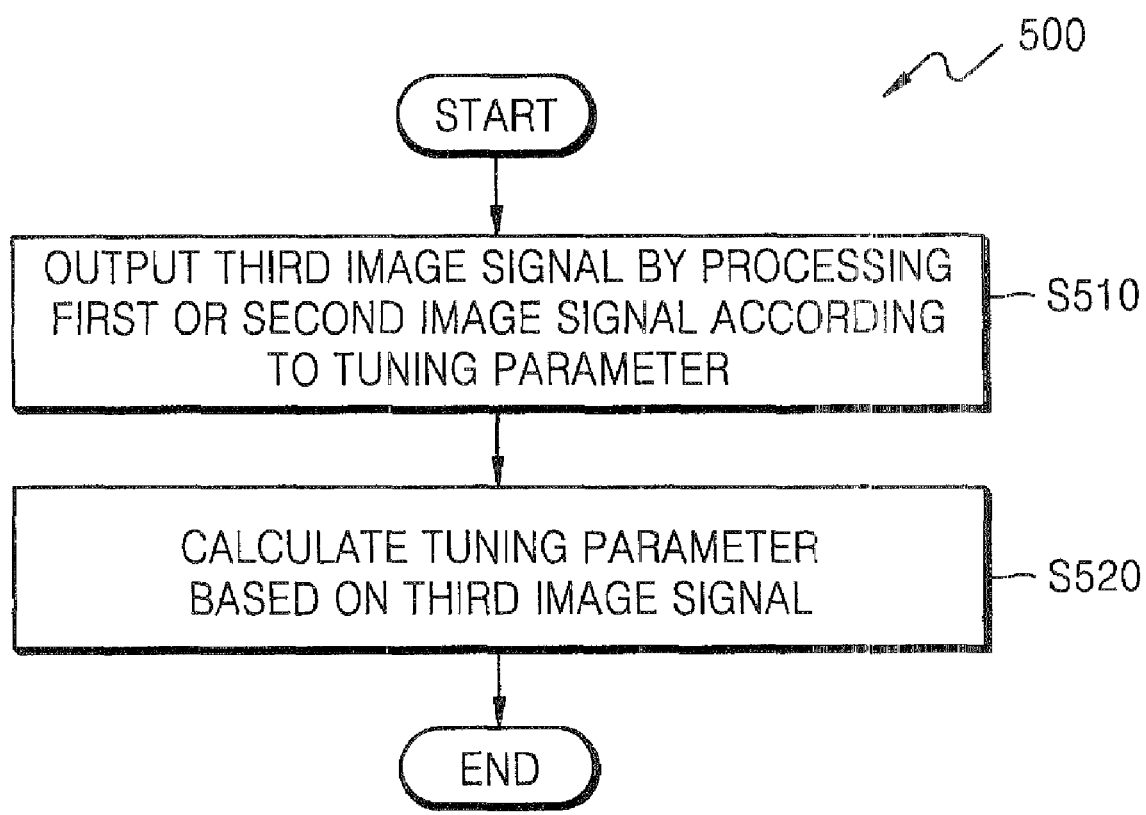
FIG. 5 is a flowchart of an image tuning method according to an exemplary embodiment of the present invention.

FIG. 5 is a flowchart of an image tuning method according to an exemplary embodiment of the present invention.

Referring to FIG. 5, the image tuning method using the stored raw image signal, that is, the image tuning method (500) performed by the image tuning system includes outputting a third image signal by processing a first or second image signal according to a tuning parameter (S510) and calculating the tuning parameter based on the third image signal (S520).

In outputting the first or second image signal as the third image signal (S510), the second image signal is processed in the tuning mode. Operation S210 of outputting the first or second image signal as the third image signal includes selecting one of the first and second image signals and processing the selected image signal.

In outputting the first or second image signal as the third image signal (S510), receiving the second image signal and outputting the third image signal is performed concurrently in a tuning mode.

Operation S510 of outputting the first or second image signal as the third image signal may further include serially outputting the third image signal in the tuning mode. Operation S510 of outputting the first or second image signal as the third image signal may further include receiving the second image signal in parallel in the tuning mode.

The image tuning method (500) includes calculating the tuning parameter based on the third image signal obtained by processing the first image signal in the normal mode. The image tuning method (500) generates the second image signal by storing the first image signal that is not processed in a first device of the image tuning system.

The image tuning method according to an exemplary embodiment of the present invention has the same technical aspect with the aforementioned image tuning system. Therefore, the image tuning method according to the exemplary embodiment of the present invention will be understood by those skilled in the art from the aforementioned description. Accordingly, the detailed description of the image tuning method will be omitted.

As described above, the image tuning system and the image tuning method using the stored raw image signal can prevent wasting time and extra efforts are not required for setting the tuning parameter to be adaptive to various weather conditions by repeatedly setting the tuning parameter with respect to a picture image.

While the present invention has been particularly shown as described with reference to exemplary embodiments thereof, it will be understood by those skilled in the art that various changes in form and details may be made therein without departing from the spirit and scope of the present invention as defined by the appended claims.

What is claimed is:

1. An image tuning system comprising:
   an image processing device; and
   a computer that is external to the image processing device, wherein the image processing device comprises:
      an image sensor (IS) receiving external image data;
      a parallel unit (PU) receiving and outputting parallel image data from the computer;
      a first multiplexer (MP) receiving the parallel image data and an output of the IS;
      an image signal processor (ISP) receiving an output of the first MP;
      a serial unit (SU) receiving and outputting serial image data from the ISP; and
      a second MP receiving an output of the first MP, an output of the ISP, and an output of the SU,
      wherein during a first mode, the ISP receives and processes an output of the IS from the first MP to output a first processed image signal, the second MP outputs the first processed image signal, and the computer calculates a tuning parameter from the first processed image signal,
      wherein during a second mode, the second MP receives and outputs an output of the IS from the first MP to output an un-processed image signal, and the computer stores the un-processed image signal as a stored image signal, and
      wherein during a third mode, the computer outputs the stored image signal, the PU outputs the parallel image data based on the output stored image, the first MP outputs the parallel image data to the ISP, the ISP processes the parallel image data to output a second processed image signal to the SU, the SU outputs the second processed image signal as the serial image data to the second MP, the second MP outputs the serial image data, and the computer adjusts the tuning parameter using the serial image data.

2. The image tuning system of claim 1, wherein the external image data is a raw image signal and the output of the ISP during the second mode is a raw image signal.

3. The image tuning system of claim 1, wherein the IS and the ISP are integrated into one chip.

4. The image tuning system of claim 1, wherein the parallel unit receives the parallel image data and the serial unit outputs another serial image data concurrently in the third mode.

5. The image tuning system of claim 1, wherein the computer transmits the stored image signal and receives another processed image signal concurrently.

6. The image tuning system of claim 1, further comprising an interface device interfacing between the image processing device and the computer to enable communications therebetween.

7. The image tuning system of claim 6, wherein the interface device comprises:
   a first buffer buffering data output from the computer for output to the PU;
   a second buffer buffering data output from the second multiplexer for output to the computer; and
   an interface processing unit communicating the data.

8. The image tuning system of claim 7, wherein the interface processing unit is a field programmable gate array.

9. The image tuning system of claim 7, wherein the first and second buffers are SDRAMs.

10. The image tuning system of claim 6, wherein the interface device receives data from the computer for output to the PU and receives data from the second multiplexer for output to the computer concurrently in the third mode.

11. The image tuning system of claim 6, wherein the computer comprises:
    a storage unit storing the stored image signal;
    a driver transmitting and receiving image signals; and
    a tuning tool setting the tuning parameter based on the processed image signals.

12. The image tuning system of claim 11 further comprising a USB port transmitting and receiving data between the interface device and the computer.

13. The image tuning system of claim 12, wherein the driver is a USB driver.

14. The image tuning system of claim 1, wherein the image tuning system is an off-line image tuning system.

15. An image tuning method performed by an image tuning system, the method comprising:
    during a first mode, an image signal processor (ISP) receiving and processing an output of an image sensor (IS) from a first multiplexer (MP) to output a first processed image signal, a second MP outputting the first processed image signal, and a computer calculating a tuning parameter from the first processed image signal,
    during a second mode, the second MP receiving and outputting an output of the IS from the first MP to output an un-processed image signal, and the computer storing the un-processed image signal as a stored image signal, and
    during a third mode, the computer outputting the stored image signal, a parallel unit (PU) outputting parallel image data based on the output stored image, the first MP outputting the parallel image data to the ISP, the ISP processing the parallel image data to output a second processed image signal to a serial image unit (SU), the SU outputting the second processed image signal as serial image data to the second MP, the second MP outputting the serial image data, and the computer adjusting the tuning parameter using the serial image data.

16. The image tuning method of claim 15, where the IS receives image data externally.

17. The image tuning method of claim 15, wherein the external image data and the stored image signal are raw image signals.

18. The image tuning method of claim 15, wherein the PU receives data and the SU transmits data concurrently in the third mode.

19. The image tuning method of claim 15, wherein calculating the tuning parameter comprises:
    receiving the first processed image signal through a USB interface; and
    setting the tuning parameter based on the first processed image signal.

20. The image tuning method of claim 15, wherein the image tuning method is an image tuning method performed in an off-line image tuning system.

* * * * *